R. B. CRAIG.
MULTIPLE MACHINE TOOL HOLDER.
APPLICATION FILED MAY 10, 1912.
1,061,822.
Patented May 13, 1913.
2 SHEETS—SHEET 2.
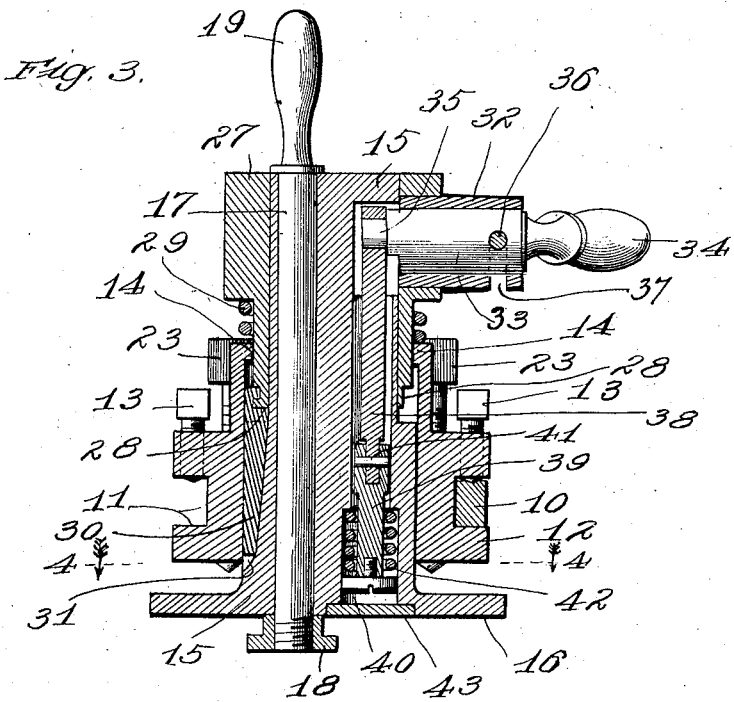
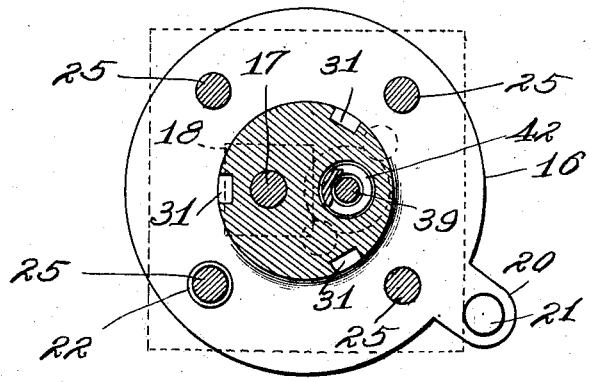
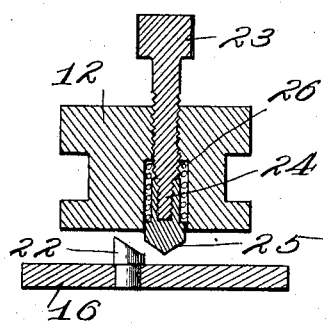
WITNESSES
INVENTOR
Robert B. Craig,
By Knight Bros
Attorneys

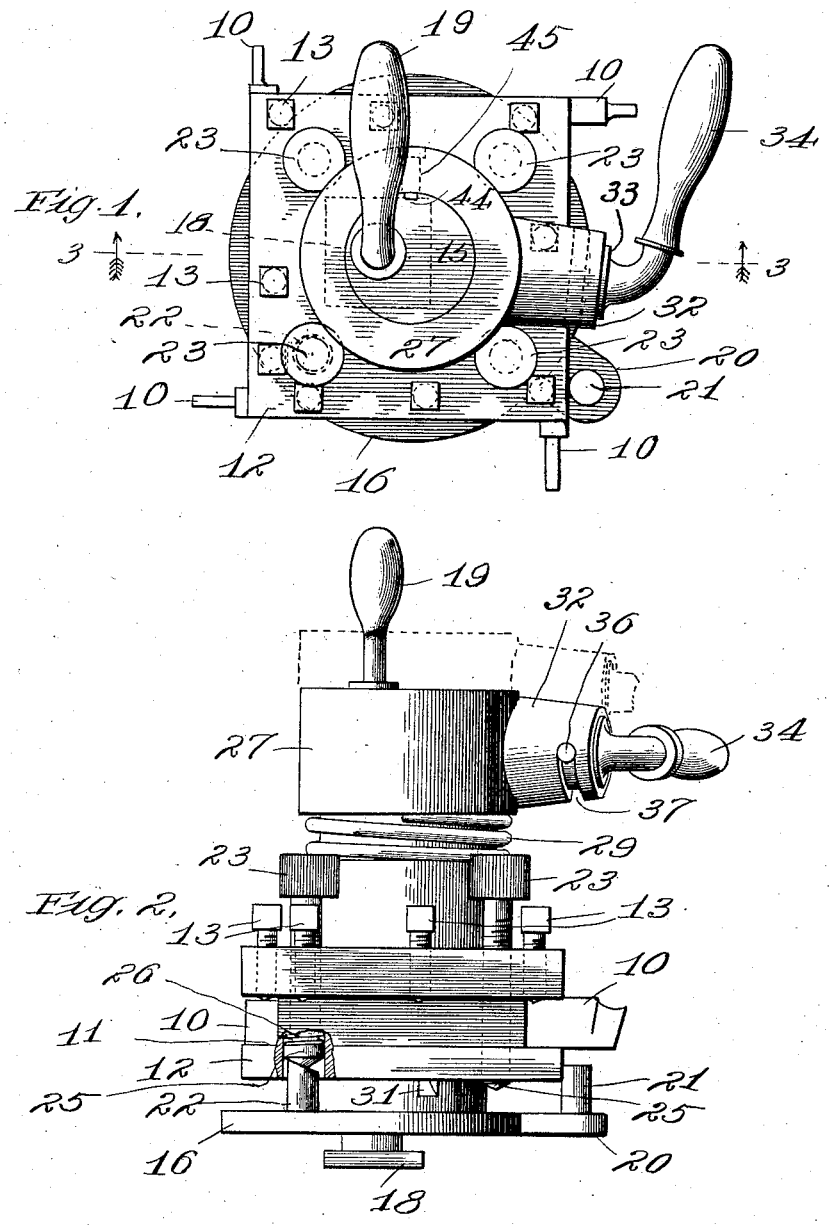

UNITED STATES PATENT OFFICE.

ROBERT B. CRAIG, OF KANSAS CITY, MISSOURI.

MULTIPLE MACHINE-TOOL HOLDER.

1,061,822.　　　　Specification of Letters Patent.　　Patented May 13, 1913.

Application filed May 10, 1912. Serial No. 696,458.

*To all whom it may concern:*

Be it known that I, ROBERT B. CRAIG, a citizen of the United States, residing at Kansas City, in the county of Jackson and State of Missouri, have invented certain new and useful Improvements in Multiple Machine-Tool Holders, of which the following is a specification.

My invention relates to tool holders adapted to receive a plurality of different tools and to support them in such relation on the carriage of the lathe or other similar machine, as will permit of bringing into use any one of the tools in the holder and will insure proper and accurate presentation of the tool in regard to the work-piece.

One object of the present invention is to have an absolutely fixed position of the holder and yet to have the holder readily releasable for its rotary movement in shifting from one tool to another.

One embodiment of my invention is illustrated in the accompanying drawings, in which, Figure 1 represents a top plan view of the tool holder; Fig. 2 a front elevation of Fig. 1; Fig. 3 a vertical section along line 3—3 of Fig. 1; Fig. 4, a plan section along line 4—4 of Fig. 3, looking down; and Fig. 5 a vertical section across one corner of the tool carrier showing the adjusting screw in detail.

The same reference characters refer to the same parts in the different figures.

The tools 10, are held in recesses 11 of the four-sided carrier 12, by means of set screws 13. The shape of the carrier 12 depends on what number of tools are intended to be held in the carrier, so that if, instead of four tools as here illustrated, six were to be carried, the tool carrier 12 would then be hexagonal, and so forth. The tool carrier 12 has a cylindrical bore in the middle terminating at the tops with an inward annular flange 14. The carrier fits snugly around a center-post 15 which has an enlarged base 16 whereon it stands on the table of a lathe, or any other machine in use in a factory. It carries a clamping screw 17, which is free to turn therein and has a handle extending beyond the central part at the top. A T-shaped clamping jaw 18 threaded on the lower end of the screw 17 engages a T-slot on the lathe, whereby in turning the handle 19, the center part 15 is securely held on the lathe table.

The base 16 is provided with an arm 20 carrying an index or stop pin 21, which is so located that it will strike the flat side of the tool carrier 12 near the corner (see Fig. 4) and normally extends above the bottom surface of the tool carrier. On the upper side of the base plate 16 and rigidly secured thereto is a stud 22 with a beveled top, inclined in the direction of the stop pin 21. This beveled stud 22 is situated at the same radial distance from the axis of revolution of the tool carrier 12 as four, or more, according to the number of tools, adjusting screws 23, which are threaded in the tool carrier 12, with screwed-on pointed ferrules 25 of slightly larger diameter than the stud 22, which ferrules are seated in chambers opening through the bottom face of the tool carrier 12, the heads of the screws 23 being accessible at the upper side of the tool carrier. The taper of the ferrule point 25 has the same angularity as the bevel of the stud 22. The relative position of the stud 22 and the stop pin 21 is such, that on revolving the tool-carrier 12 on the center-post 15, the stud 22 will intercept the ferrule of one of the adjusting screws 23 at the moment when the stop pin 21 strikes the flat side of the tool-carrier 12. The stud 22 has then as a rule entered the ferrule chamber. The tool carrier will then be held rigidly sidewise between the stop pin 21 and the beveled stud 22. To retain the screws 23 in a given position, a spring 26 is inserted in the chamber provided for it in the tool-carrier 12, acting between a shoulder on the ferrule 25 and one end of the chamber, setting up friction in turning the screw, see Fig. 5.

At the upper end of the center-post 15 where its diameter is decreased, it is inclosed by a cylindrical block 27, the lower and narrower portion of which fits snugly inside the annular flange 14, of the tool-carrier 12. The block 27 is provided with an annular rim 28 at its bottom edge, and a number of wedges 30 extending therefrom are held in position by said rim. In a center-post 15 are provided grooves 31 for these wedges and each groove has an inner tapered wall corresponding with the taper of the wedge. In pushing the block and the wedges downward, the wedges will then be made to grip between said tapered wall and the inner cylindrical surface of the tool-carrier 12. The shoulders at the top of the wedges will limit the upward movement of the block and wedges, relative to the tool carrier, when impinging with the annular flange 14 of the tool-carrier 12. A spring 29 is inserted between the top of the tool-carrier and the shoulder of the head 27 around its narrow lower shank. At its upper end, the block 27 is provided with a transverse sleeve 32 in which is carried the crank shaft 33 with an inwardly projecting crank pin 35. At its outer end, the crank shaft has a handle 34 and the shaft is held in position in the sleeve 32 by the pin 36 working in the slot 37. The length of the slot is selected so as to give a revolving movement of 180° of the crank shaft. The center-post 15 has a longitudinal bore wherein said crank pin 35 operates and the bore forming a chamber for a piston 39 with piston head 40. The pitman 38 connects crank pin 35 with the piston 39 and a spring 42 is inserted in the chamber and exerts pressure between the head 40 and a shoulder in the chamber, always drawing the piston head downward. The chamber is closed up at the bottom by a cover-plate 43, and the piston rests on this cover-plate in one of its extreme positions. With the piston and crank shaft in this last named position, the spring 29 is free to expand, thereby raising block 27 and withdrawing the wedges 30 from the gripping position between the center-post 15 and the tool-carrier 12 until the upper ends of the wedges impinge the flange 14 in the carrier. As the spring 29 is now restricted from further expansion, the tool carrier 12 and the block 27 constitute a solid body. The piston 40, coming in contact with the plate 43 after a turn of about 80° of the handle 34, and the parts 12 and 27 now acting as one, the last part of the turn of the handle will slightly raise the tool-carrier 12 and the block 27, using the crank pin 35 as fulcrum. The tool-carrier will then be free to revolve on the center-post, passing above the stop pin 21, and another tool may therefore be swung in position for action, being properly located, as already described, by one of the screws 23, the dowel pin 22 and a stop pin 21, on turning back the handle 34. The crank shaft will then again operate the piston 40 against the spring 42, thereby lowering the block 27 and compressing spring 29 simultaneously driving the wedges 30 tightly in between the acting surfaces of the center-post and the tool-carrier.

Beside locating the tool carrier and the tools in the proper lateral position, the screws and ferrules 23, 25, also serve to accurately locate each tool separately relatively to the work piece. This is accomplished by turning the screws 23, and the variation in the height of the tool will then directly correspond to the distance the ferrule 25 is away from the bottom of the tool carrier 12.

Revolving the handle 34 one half of a revolution, the operations are as follows: The crank pin 35 moves down, taking parts 38, 39, 40 with it, until piston 40 rests on plate 43, 42 being allowed to expand. At this point, crank pin 35 ceases to move down and block 27 and keys 30 begin to move upward. The keys are first pulled from their wedging position, second, impinge flange 14, and third, elevate carrier 12 above pins 21, 22 by means of the lifting action of the crank pin 35 during the last part of the turning of handle 34, leaving carrier 12 free to revolve. After turning carrier 12 until a new tool is presented to the work, the handle 34 is returned to the starting point. In this move, block 27, spring 29, keys 30 and carrier 12 all descend until one of the ferrules 25 comes in contact with stud 22, at which point carrier 12 stops, and parts 27 and 30 continue to move down, the spring 29 being compressed and bearing down on the tool carrier 12. As the keys 30 come to their wedging position, piston 40 leaves plate 43, and spring 42 is compressed. The object of spring 42 is to compensate for wear on keys 30 and to allow pin 35 to pass the center.

I claim:—

1. A multiple machine tool-holder having a central post by means of which the holder is secured on a machine, a revolving tool-carrier seated on said post provided with an equal number of straight sides as the number of tools, and means for axially clamping said tool-carrier to said post; an automatic device for positive lateral adjustment between said tool carrier and post in a plurality of predetermined positions, said adjusting device comprising a stop pin situated on said central post and at such a distance from its axis that it will impinge any one of said straight sides of the tool-carrier near the extreme point thereof.

2. A multiple machine tool-holder having a central post by means of which the holder is secured on a machine, a revolving tool-carrier seated on said post provided with an equal number of straight sides as the number of tools, and means for axially clamping said tool-carrier to said post; an automatic device for positive lateral adjustment between said tool carrier and post in a plurality of predetermined positions, said adjusting device comprising a stop pin situated on said central post and at such a distance from its axis that it will impinge any one of said straight sides of the tool-carrier near the extreme point thereof, a tapered point for each of said tools on said tool-carrier situated equi-distant from the axis of the holder, and a stud on the central post, said stud having a beveled face located in the path of the tapered points on rotating said tool-carrier.

3. A multiple machine tool-holder having a central post by means of which the holder is secured on a machine, a revolving tool-carrier seated on said post provided with an equal number of straight sides as the number of tools, and means for axially clamping said tool-carrier to said post; an automatic device for positive lateral adjustment between said tool carrier and post in a plurality of predetermined positions, said adjusting device comprising a stop pin situated on said central post and at such a distance from its axis that it will impinge any one of said straight sides of the tool-carrier near the extreme point thereof, and an adjusting screw with a tapered point for each of said tools on said tool-carrier situated equi-distant from the axis of the holder, and a stud on the central post, said stud having a beveled face located in the path of the tapered points on rotating said tool-carrier.

4. A multiple machine tool-holder having a central post by means of which the holder is secured on a machine, a revolving tool-carrier seated on said post provided with an equal number of straight sides as the number of tools, and means for axially clamping said tool-carrier to said post; an automatic device for positive lateral adjustment between said tool carrier and post in a plurality of predetermined positions, said adjusting device comprising a stop pin situated on said central post and at such a distance from its axis that it will impinge any one of said straight sides of the tool-carrier near the extreme point thereof, and an adjusting screw with a tapered point for each of said tools on said tool-carrier situated equi-distant from the axis of the holder, and a stud on the central post, said stud having a beveled face located in the path of the tapered points on rotating said tool-carrier; said adjusting screw being provided with a frictional spring for retaining the adjusting screw in any given position.

5. A multiple machine tool-holder having a central post by means of which the holder is secured on a machine, a revolving tool-carrier seated on said post provided with an equal number of straight sides as the number of tools, and means for axially clamping said tool-carrier to said post; an automatic device for positive lateral adjustment between said tool carrier and post in a plurality of predetermined positions, said adjusting device comprising a stop pin situated on said central post and at such a distance from its axis that it will impinge any one of said straight sides of the tool-carrier near the extreme point thereof, and an adjusting screw with a tapered point for each of said tools on said tool-carrier situated equi-distant from the axis of the holder, and a stud on the central post, said stud having a beveled face located in the path of the tapered points on rotating said tool-carrier, whereby said tool-carrier will tend to rotate in one direction actuated by said bevel face and tapered points.

6. A multiple machine tool-holder having a central post by means of which the holder is secured on a machine, a revolving tool-carrier seated on said post provided with an equal number of straight sides as the number of tools, and means for axially clamping said tool-carrier to said post; an automatic device for positive lateral adjustment between said tool carrier and post in a plurality of predetermined positions, said adjusting device comprising a stop pin situated on said central post and at such a distance from its axis that it will impinge any one of said straight sides of the tool-carrier near the extreme point thereof, and an adjusting screw with a tapered point for each of said tools on said tool-carrier situated equi-distant from the axis of the holder, and a stud on the central post, said stud having a beveled face located in the path of the tapered points on rotating said tool-carrier, said bevel faced stud in coöperation with any one of said taper pointed screws, said stop pin and one or the other of said straight sides on the tool carrier positively holding said tool carrier in any one of a plurality of predetermined positions.

7. In a multiple machine tool-holder having a central post by means of which the holder is secured on a machine, a revolving tool-carrier seated on said post provided with an equal number of straight sides as the number of tools, and means for axially clamping said tool-carrier to said post; the combination with an automatic device for positive lateral adjustment between said tool carrier and post in a plurality of predetermined positions, said adjusting device comprising a stop pin situated on said central post and at such a distance from its axis that it will impinge any one of said straight sides of the tool-carrier near the extreme point thereof, and an adjusting screw with a tapered point for each of said tools on said tool-carrier situated equi-distant from the axis of the holder, and a stud on the central post, said stud having a beveled face located in the path of the tapered points on rotating said tool-carrier; a frictional spring for retaining said adjusting screw in any given position; the setting of each individual adjusting screw giving to each tool its proper vertical adjustment relative to the work piece.

The foregoing specification signed this 22nd day of April, 1902.

ROBERT B. CRAIG.

In presence of—
BENJ. L. SIMPSON,
EDWARD FARLEY.

Copies of this patent may be obtained for five cents each, by addressing the "Commissioner of Patents, Washington, D. C."